US011856467B2

United States Patent
Koskela et al.

(10) Patent No.: US 11,856,467 B2
(45) Date of Patent: Dec. 26, 2023

(54) CELL RANKING IN MULTI BEAM SYSTEM

(71) Applicant: Nokia Technologies Oy, Espoo (FI)

(72) Inventors: Timo Koskela, Oulu (FI); Jorma Kaikkonen, Oulu (FI); Jedrzej Stanczak, Wroclaw (PL); Samuli Turtinen, Ii (FI); Jarkko Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 717 days.

(21) Appl. No.: 16/610,515

(22) PCT Filed: Jun. 20, 2018

(86) PCT No.: PCT/IB2018/054563
§ 371 (c)(1),
(2) Date: Nov. 4, 2019

(87) PCT Pub. No.: WO2019/003059
PCT Pub. Date: Jan. 3, 2019

(65) Prior Publication Data
US 2020/0154327 A1 May 14, 2020

Related U.S. Application Data

(60) Provisional application No. 62/524,834, filed on Jun. 26, 2017.

(51) Int. Cl.
*H04W 36/00* (2009.01)
*H04B 7/06* (2006.01)
(Continued)

(52) U.S. Cl.
CPC .... *H04W 36/00837* (2018.08); *H04B 7/0617* (2013.01); *H04B 7/0695* (2013.01);
(Continued)

(58) Field of Classification Search
CPC .... H04B 7/022; H04B 7/0617; H04B 7/0695; H04W 36/00835; H04W 36/00837; H04W 36/06; H04W 36/30; H04W 48/20
See application file for complete search history.

(56) References Cited

U.S. PATENT DOCUMENTS

| 6,438,389 B1 | 8/2002 | Sandhu et al. |
| 2002/0012380 A1 | 1/2002 | Hottinen et al. |

(Continued)

FOREIGN PATENT DOCUMENTS

| CN | 103493536 A | 1/2014 |
| CN | 106488472 A | 3/2017 |

(Continued)

OTHER PUBLICATIONS

Extended European Search Report received for corresponding European Patent Application No. 18825195.3, dated Feb. 2, 2021, 10 pages.

(Continued)

*Primary Examiner* — Mazda Sabouri
(74) *Attorney, Agent, or Firm* — ALSTON & BIRD LLP

(57) ABSTRACT

In accordance with an example embodiment, there is disclosed a method comprising: receiving, by a user equipment in a wireless network, beam information from a serving cell and each neighboring cell; assessing a beam quality of the serving cell and each neighboring cell from the information; determining a subset of the serving cell and neighboring cells comprising the serving cell and each neighboring cell with a beam quality within a first offset of the serving cell and each neighboring cell with a highest quality beam; ranking each cell of the subset in descending order from highest to lowest quality.

23 Claims, 2 Drawing Sheets

(51) Int. Cl.
*H04W 36/30* (2009.01)
*H04W 48/20* (2009.01)

(52) U.S. Cl.
CPC ..... *H04W 36/00835* (2018.08); *H04W 36/30* (2013.01); *H04W 48/20* (2013.01)

(56) References Cited

U.S. PATENT DOCUMENTS

| | | | |
|---|---|---|---|
| 2005/0176385 | A1 | 8/2005 | Stern-Berkowitz et al. |
| 2005/0202859 | A1 | 9/2005 | Johnson et al. |
| 2010/0216455 | A1 | 8/2010 | Kazmi |
| 2014/0010142 | A1 | 1/2014 | Ranta-Aho et al. |
| 2015/0049824 | A1 | 2/2015 | Kim et al. |
| 2015/0222345 | A1 | 8/2015 | Chapman et al. |
| 2016/0095102 | A1 | 3/2016 | Yu et al. |
| 2016/0150435 | A1* | 5/2016 | Baek ............ H04B 7/0608 370/252 |
| 2016/0262077 | A1* | 9/2016 | Zhang ............ H04W 36/0085 |
| 2017/0006539 | A1* | 1/2017 | Kakishima ............ H04W 36/08 |
| 2017/0208494 | A1 | 7/2017 | Moon et al. |
| 2017/0215117 | A1* | 7/2017 | Kwon ............ H04W 36/32 |
| 2019/0173533 | A1* | 6/2019 | Kim ............ H04B 7/0408 |

FOREIGN PATENT DOCUMENTS

| | | | |
|---|---|---|---|
| EP | 2198635 | A1 | 6/2010 |
| GB | 2516463 | A | 1/2015 |
| WO | 2009/046776 | A1 | 4/2009 |
| WO | WO 2015/141071 | A1 | 9/2015 |
| WO | WO 2016/085266 | A1 | 6/2016 |
| WO | 2016/138655 | A1 | 9/2016 |
| WO | 2016/163786 | A1 | 10/2016 |
| WO | 2018/080723 | A1 | 5/2018 |
| WO | 2018/082904 | A1 | 5/2018 |

OTHER PUBLICATIONS

"Derivation of Cell Quality in Idle/Inactive", 3GPP TSG-RAN WG2 Meeting #98, R2-1705435, Agenda: 10.4.2.2, Ericsson, May 15-19, 2017, 3 pages.
Office action received for corresponding Chinese Patent Application No. 201880038880.8, dated Jun. 3, 2021, 4 pages of office action and 4 pages of Translation available.
"Cell Re-Selection Measurement Window", 3GPP TSG-RAN WG2 #98, Tdoc R2-1705436, Agenda: 10.4.2.2, Ericsson, May 15-19, 2017, pp. 1-4.
"Derivation of Cell Quality in Idle/Inactive", 3GPP TSG-RAN WG2 Meeting #98, R2-1704896, Agenda: 10.4.2.2, Huawei, May 15-19, 2017, 2 pages.
"3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304, V14.2.0, Mar. 2017, pp. 1-49.
"3rd Generation Partnership Project; Technical Specification Group Radio Access Network; New Generation Radio Access Network; User Equipment (UE) procedures in Idle mode (Release 15)", 3GPP TS 38.304, V0.0.3, May 2017, pp. 1-12.
International Search Report and Written Opinion received for corresponding Patent Cooperation Treaty Application No. PCT/IB2018/054563, dated Nov. 19, 2018, 15 pages.
"3rd Generation Partnership Project; Technical Specification Group Radio Access Network; Requirements for support of radio resource management (TDD) (Release 13)", 3GPP TS 25.123 v 13.0.0, (Jan. 2016), 454 pages.
Extended European Search Report for European Application No. 17169373.2 dated Aug. 9, 2017, 10 pages.
Office Action for Chinese Application No. 201880038880.8 dated Jan. 27, 2022, 14 pages.
Office Action for European Application No. 17169373.2 dated Jun. 21, 2019, 5 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", 3GPP TS 36.300, V13.3.0, Mar. 2016, pp. 1-295.
"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.1.0, Mar. 2016, pp. 1-551.
Advisory Action for U.S. Appl. No. 15/586,227 dated Jul. 29, 2021.
Advisory Action for U.S. Appl. No. 15/586,227 dated Jul. 30, 2019.
Advisory Action for U.S. Appl. No. 15/586,227 dated Jul. 6, 2020.
Final Office Action for U.S. Appl. No. 15/586,227 dated Apr. 9, 2019.
Final Office Action for U.S. Appl. No. 15/586,227 dated Mar. 9, 2020.
Final Office Action for U.S. Appl. No. 15/586,227 dated May 14, 2021.
Non-Final Office Action for U.S. Appl. No. 15/586,227 dated Dec. 10, 2018.
Non-Final Office Action for U.S. Appl. No. 15/586,227 dated Dec. 9, 2020.
Non-Final Office Action for U.S. Appl. No. 15/586,227 dated Nov. 12, 2019.
Notice of Allowance for U.S. Appl. No. 15/586,227 dated Sep. 7, 2021.
Office Action for Chinese Application No. 201880038880.8 dated Jun. 2, 2022, 10 pages.
Office Action for European Application No. 18825195.3 dated Nov. 30, 2022, 6 pages.
Extended European Search Report for European Application No. 22160241.0 dated May 19, 2022, 6 pages.
Non-Final Office Action for U.S. Appl. No. 17/546,485 dated May 3, 2023.

* cited by examiner

CELL RANKING IN MULTI BEAM SYSTEM

RELATED APPLICATION

This application was originally filed as PCT Application No. PCT/IB2018/054563 filed Jun. 20, 2018 which claims priority benefit from U.S. Application No. 62/524834 filed Jun. 26, 2017.

TECHNICAL FIELD

This invention relates generally to New Radio (NR) and, in particular, to improving performance of intra-frequency cell ranking in a multibeam system in a UE-based mobility environment.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

In NR, a UE determines the cell quality level (e.g. RSRP (dBm), RSRQ (dB)) based on beam measurements. These measurement quantities can be based on measurement done on signals encompassed in SS block (in IDLE and in RRC_INACTIVE), namely on SSS and/or PBCH DMRS. The SS block can be transmitted to one beam, the SS block can be superposed on multiple beams, and/or different SS blocks can be sent on different beams. In CONNECTED mode a UE may measure the quality in addition to SS block signals, based on CSI-RS (for beam management, sometimes called intra-cell mobility and/or L3 mobility, or cell level mobility) configured to the UE. In some cases UE may also measure CSI-RS (or any reference signals for mobility purposes also in IDLE/INACTIVE).

Several papers on the subject have been submitted to 3GPP RAN2#98 (May 2017) but, according to the Chairman notes, were not treated (a related discussion was expected at the next RAN2 meeting). For example, Huawei (in R2-1704896 Derivation of cell quality in IDLE/INACTIVE, Huawei, HiSilicon, 3GPP TSG-RAN WG2 Meeting #98, Hangzhou, China, 15-19 May 2017) proposed a method to derive cell quality in RRC_Idle/RRC_Inactive mode, wherein a method would be to simply average multiple beams to derive cell-level quality. However, by performing such a step, information that would be lost includes the per beam quality and the information about the actual number of beams (or "good beams") per cell, which are of paramount importance and not neglected in the procedure disclosed by the invention herein.

Ericsson (in R2-1705436 Derivation of cell quality in IDLE/INACTIVE, Ericsson, 3GPP TSG-RAN WG2 Meeting #98, Hangzhou, China, 15-19 May 2017) also touched upon the topic, but without proposing any specific procedure, focusing more on the value of N (i.e. the number of beams) and suggesting considering a relative threshold (i.e. offset), rather than an absolute threshold.

The current invention moves beyond the current techniques and/or materials.

Acronyms or abbreviations that may be found in the specification and/or the drawing figures are defined within the context of this disclosure or as follows below:

3GPP Third Generation Partnership Project
5G 5th Generation
ACK Acknowledgement
AR Augmented Reality
CSI-RS Channel State Information-Reference Signals
DCI Downlink Control Information
DL Downlink
DL-SCH Downlink Shared Channel
DMRS Demodulation Reference Signal
eNB or eNodeB base station, evolved Node B
FFS For Further Study
gNB NR/5G Node B
HO Handover
HARQ Hybrid Automatic Repeat Request
LTE Long Term Evolution
LTE-A Long Term Evolution-Advanced
LVL Level
MBB Mobile Broadband
MME Mobility Management Entity
MSG Message
NACK Negative Acknowledgement
NCE Network Control Entity
NR New Radio
NW Network
OFDM Orthogonal Frequency Division Multiplexing
PBCH Physical Broadcast Channel
PDCCH Physical Downlink Control Channel
PDSCH Physical Downlink Shared Channel
PRACH Physical Random Channel
PRB Physical Resource Block
PSS Primary Synchronization Signal
PUCCH Physical Uplink Control Channel
PUSCH Physical Uplink Shared Channel
RACH Random Access Channel
RA Resource Allocation
RAR Random Access Response
RAT Radio Access Technology
RB Resource Block
Rel Release
RE Resource Element
RS Reference Signal
RSRP Reference Signal Received Power
RSRQ Reference Signal Received Quality
RRC Radio Resource Control
RV Redundancy Version
RX Reception
SS Synchronization Signal
SSS Secondary Synchronization Signal
TB Transport Block
TS Technical Specification
TRP Transmission reception point
TTI Transmission Time Interval
TTT Time To Trigger
UE User Equipment
TX Transmission
UCI Uplink Control Information
UE User Equipment
UL Uplink

SUMMARY

Various aspects of examples of the invention are set out in the claims.

According to a first aspect of the present invention, an apparatus comprising at least one processor and at least one memory including computer program code, wherein the at least one memory and the computer code are configured to, with the at least one processor, cause the apparatus to at least: receive beam information from a serving cell and each neighboring cell; assess a beam quality of the serving cell and each neighboring cell from the information; determine a subset of the serving cell and neighboring cells comprising the serving cell and each neighboring cell with a beam quality within a first offset of the serving cell and each neighboring cell with a highest quality beam; rank each cell of the subset in descending order from highest to lowest quality; calculate, firstly, a reception level of the strongest cell minus a second offset for a duration of a first time-to-trigger and, secondly, a reception level of the strongest cell minus the second offset for a duration of a second time-to-trigger; compare reception levels of beams from each ranked cell to the first calculation and second calculation; advance the order of each ranked cell per beam with a reception level greater than: the first calculation by a first grade, the second calculation by a second grade, and an equally ranked cell by a fractional grade; select a cell having a highest order.

According to a second aspect of the present invention, a method comprising: receiving, by a user equipment in a wireless network, beam information from a serving cell and each neighboring cell; assessing a beam quality of the serving cell and each neighboring cell from the information; determining a subset of the serving cell and neighboring cells comprising the serving cell and each neighboring cell with a beam quality within a first offset of the serving cell and each neighboring cell with a highest quality beam; ranking each cell of the subset in descending order from highest to lowest quality; calculating, firstly, a reception level of the strongest cell minus a second offset for a duration of a first time-to-trigger and, secondly, a reception level of the strongest cell minus the second offset for a duration of a second time-to-trigger; comparing reception levels of beams from each ranked cell to the first calculation and second calculation; advancing the order of each ranked cell per beam with a reception level greater than: the first calculation by a first grade, the second calculation by a second grade, and an equally ranked cell by a fractional grade; selecting a cell having a highest order.

According to a third aspect of the present invention, a computer program product comprising a non-transitory computer-readable medium bearing computer program code embodied therein for use with a computer, the computer program code comprising code for: receiving, by a user equipment in a wireless network, beam information from a serving cell and each neighboring cell; assessing a beam quality of the serving cell and each neighboring cell from the information; determining a subset of the serving cell and neighboring cells comprising the serving cell and each neighboring cell with a beam quality within a first offset of the serving cell and each neighboring cell with a highest quality beam; ranking each cell of the subset in descending order from highest to lowest quality; calculating, firstly, a reception level of the strongest cell minus a second offset for a duration of a first time-to-trigger and, secondly, a reception level of the strongest cell minus the second offset for a duration of a second time-to-trigger; comparing reception levels of beams from each ranked cell to the first calculation and second calculation; advancing the order of each ranked cell per beam with a reception level greater than: the first calculation by a first grade, the second calculation by a second grade, and an equally ranked cell by a fractional grade; selecting a cell having a highest order.

BRIEF DESCRIPTION OF THE DRAWINGS

In the attached Drawing Figures.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe how a UE would perform intra-frequency cell ranking in multi beam system in UE based mobility. Typically, a UE based mobility has been a feature of IDLE mode (e.g. in LTE), but now this invention proposes that a UE would perform it also in INACTIVE mode.

Mechanisms described in the invention are also applicable for CONNECTED mode operation, e.g. when UE is configured to perform "conditional HO" (i.e. the HO with an early HO command and the condition which needs to be fulfilled in order to execute the actual HO) and has multiple cells with high quality beams to select from. This may be a non-trivial task to properly choose the best cell instantaneously by measuring and weighting the beams.

The following cell reselection methods, as specified in TS 36.304, and are most likely applicable for NR as well. A UE performs cell reselection based on the corresponding parameters broadcast while the UE is camping on a cell (receives information from network, e.g. system information and paging) in NR:
Intra-frequency reselection is based on ranking of cells;
Inter-frequency reselection is based on absolute priorities;
Inter-RAT reselection can be also based on absolute priorities;
Frequency specific cell reselection parameters common to all neighboring cells on a frequency;
Service-specific prioritization, noting that for NR, it is FFS for which services the service specific prioritization is applied and how it could be applied for the case of network slices;
A concept of neighbor cell lists and black cell lists;
Speed dependent cell reselection.

In multi-beam operations, measurement quantity of a cell is derived from N best beams (N-best referring to the N highest quality beams based on measurement quantity such as RSRP, or RSRQ, SINR etc.) corresponding to the same cell where the value of N can be configured to 1 or more than 1. It is FFS on the details of filtering to be applied (e.g. for the case N=1, the best beam is filtered by a single filter as the best beam changes) and whether to only consider beams above a threshold (so-called "good beams").

Figure 1:
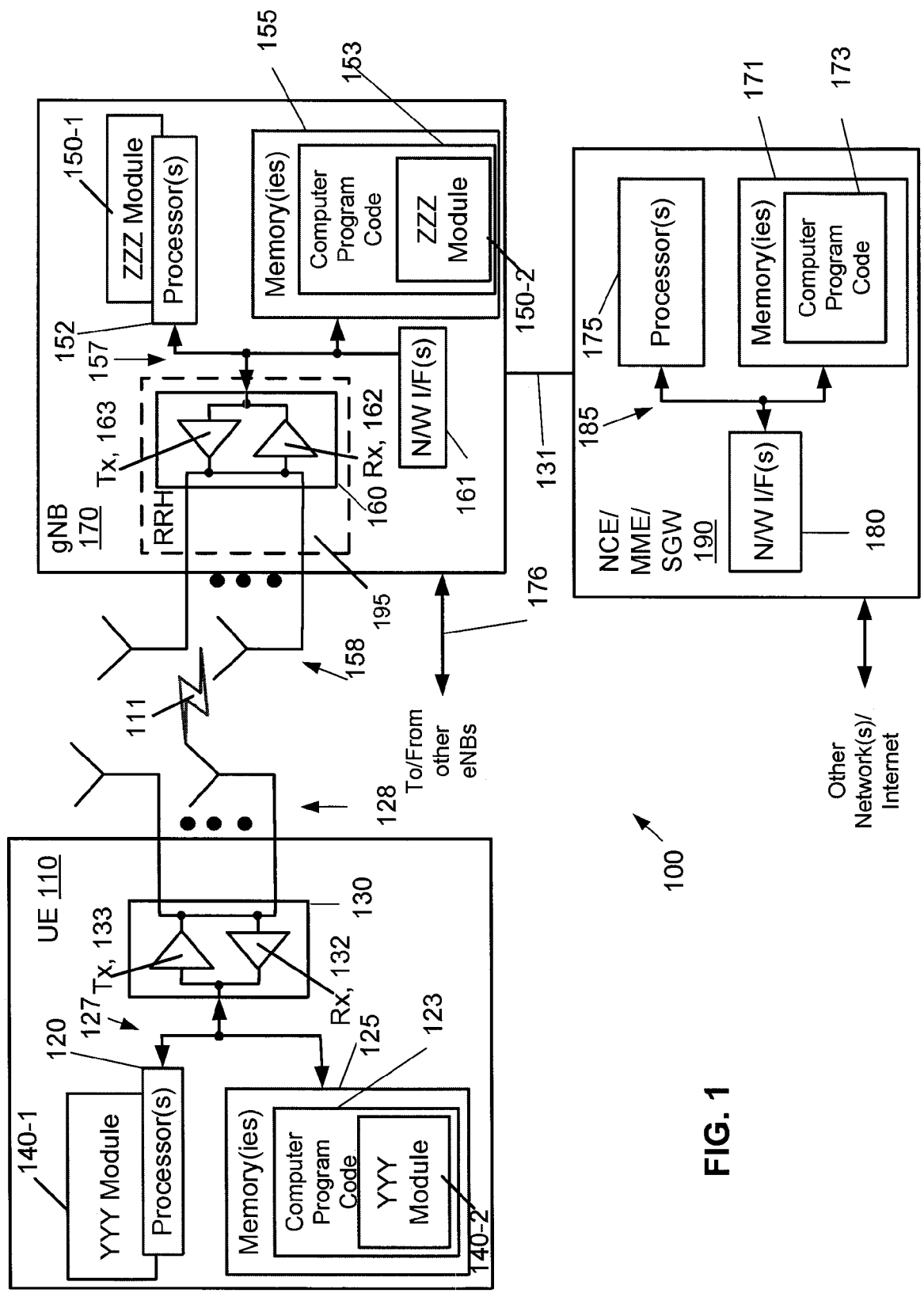
FIG. 1 is a block diagram of an exemplary system in which the exemplary embodiments may be practiced.

For a cell ranking procedure in multiple beam system, a UE performs cell ranking between cells which RX-LVL (where RX-LVL is determined e.g. based on the RSRP, RSRQ or the like) are within a configured relative offset compared to the cell with highest RX-LVL by considering the contribution factor of number of high quality beams on each cell, where the high quality beams are determined based on NW configured parameters (e.g. another offset value). Beam quality evaluation may apply different filtering scheme compared to cell quality evaluation. The contribution factor is calculated based on the observed quality based on the configured threshold signal levels and time window. The cell with the higher number of high quality beams may rank that certain cell higher Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with gNB 170 via a wireless link 111.

The gNB (NR/5G Node B but possibly an evolved NodeB) 170 is a base station (e.g., for LTE, long term evolution) of the set of base stations available to the UE 110 that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a 77Z module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

Figure 2:
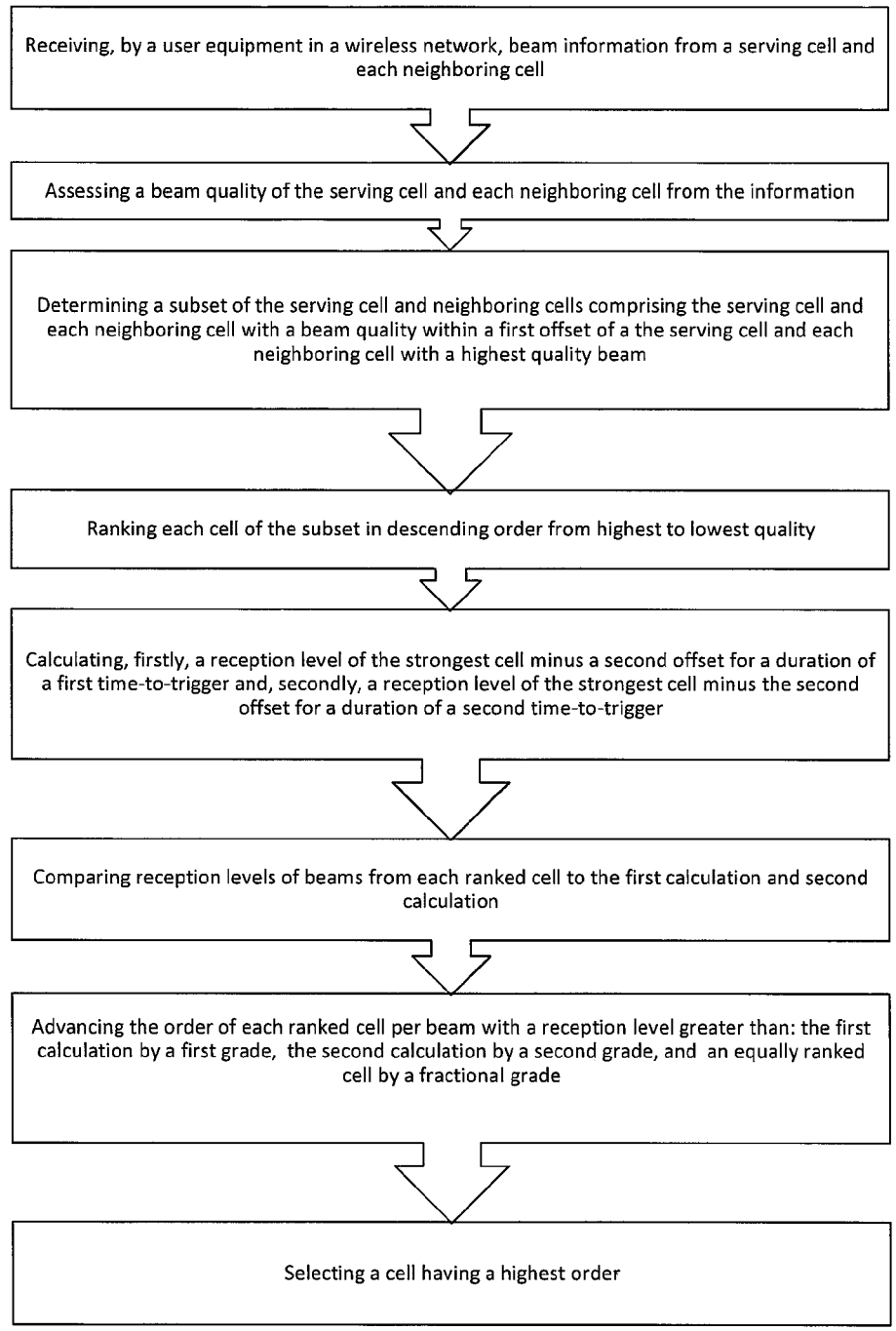
FIG. 2 is a logic flow diagram illustrating the operation of an exemplary method or methods, resulting from an execution of computer program instructions embodied on a computer readable memory, and/or functions performed by logic implemented in hardware or other means, in accordance with exemplary embodiments, which would be possible.
Figure 2:
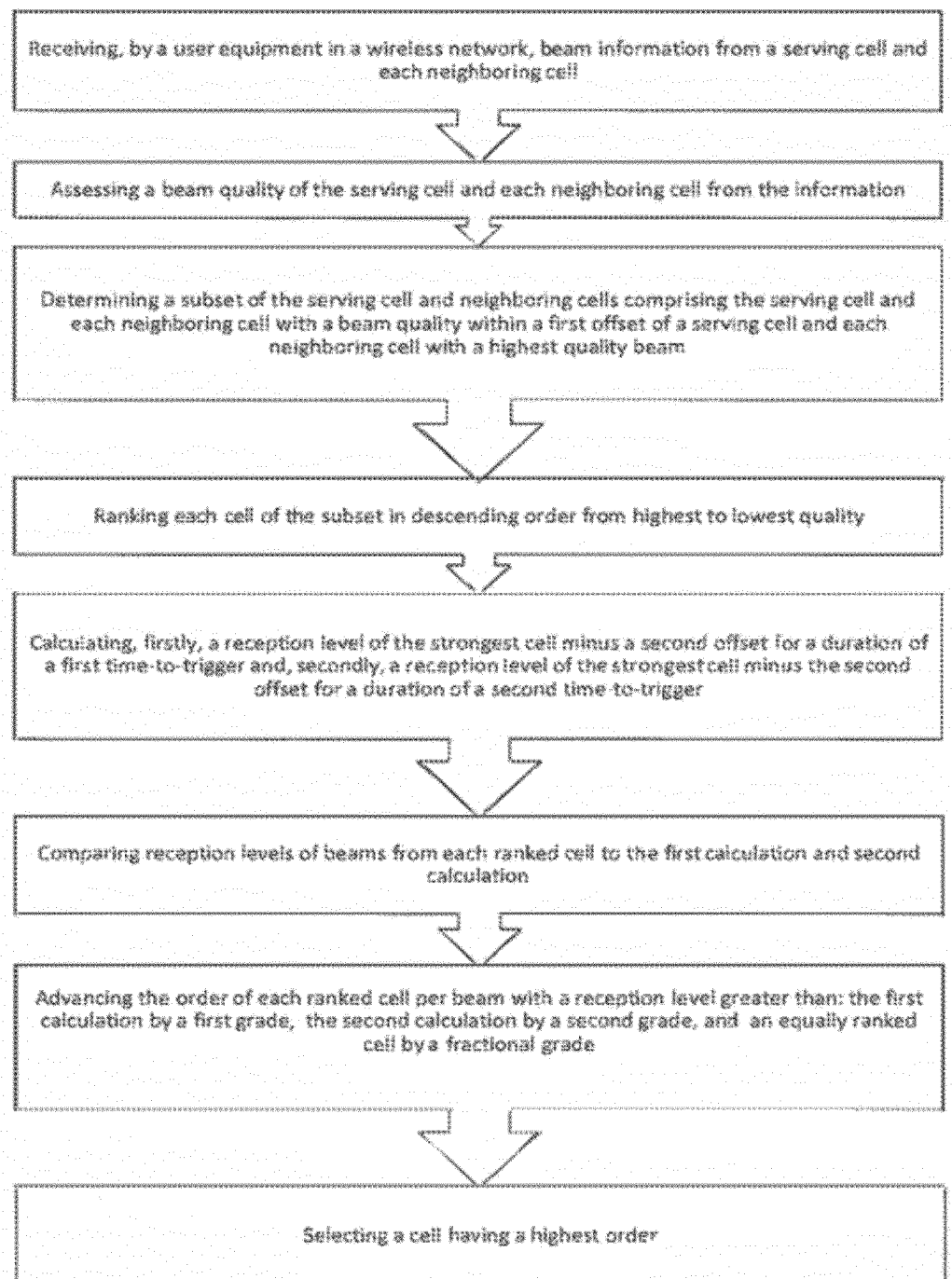

FIG. 2 is a logic flow diagram illustrating the operation of an exemplary method or methods, resulting from an execution of computer program instructions embodied on a computer readable memory, and/or functions performed by logic implemented in hardware or other means, in accordance with exemplary embodiments, which would be possible. Cell quality (RX-LVL) is based on the RX-LVL of the highest quality beam (RSRP of SS block/CSI-RS), although other measurement quantities are not precluded by the algorithm. Cell quality (RX-LVL) may refer to the L3 filtered (e.g. moving average such as defined in LTE) cell quality or cell quality that is not L3 filtered The proposed ranking procedure comprises the following three steps.

In step 1, the UE determines the highest quality cell (e.g. Cell1) and determines whether any cell from the subset of Cell2 through CellN qualities is within Offset_1 of the Cell1 (N dB). If no cells are within the Offset_1 (i.e. relative threshold), then the highest quality cell is ranked first and Cell2 through CellN are ranked according to a descending order based on quality. If any of the cells are within the Offset_1 of highest quality cell, then it is considered for second step. All other cells are ranked in descending order based on quality.

In step 2, for all the cells that are within the Offset_1 in Step 1, the UE determines the number of HighQuality beams based on the higher layer (e.g. L2/L3, moving average filter) filtered beam measurements. Higher layer beam filtering, such as moving average is used to filter L1 measurements (L1 measurement e.g. RSRP may consist of N–L1 samples). In moving average filtering, previous filtered measurement result is weighted with weight_1 and the latest received measurement result is weighted with weight_2. As an example, weights can be selected so that weight_1=alpha and weight_2=1–alpha. Filtering parameters that are used to calculate alpha may be configurable by network.

The UE utilizes TTT_1 and Offset_2 to determine if a beam is classified as HighQuality. Offset_2 is compared against the highest quality beam of the highest quality cell, determined in Step 1. Offset_2 may also be same as Offset_1 in Step 1. If a beam RX-LVL>Cell1 RX-LVL–Offset_2 for the duration of (at least, meaning equal time or longer) TTT_1, then it contributes, +1 for example, to the overall cell rank (TTT_1 can be also set to '0' so that e.g. based on one measurement (or the latest measurement or measurement result) the beam contributes the specified value to cell rank such as +1). TTT_1 parameter may also be omitted from this step which causes the cell ranking to be based on the latest measurements similarly as TTT_1 would be set to '0'. This measurement may be a L1 measurement (i.e. only L1 filtering is applied) or the latest higher layer filtered measurement result. Additionally, if a beam RX-LVL>Cell1 RX-LVL–Offset_2 for duration of TTT_2, then it contributes e.g. +2 to the overall cell rank. Note that the Offset_2 may not be defined in the algorithm at all and so the Offset_1 would be used instead. In similar manner TTT_2 may not be used i.e. beam would contribute to cell rank single value based on TTT_1. The increase in cell ranks would be for each high quality beam, i.e. 2 cells that have highest quality beam inside within the offset_1 are compared based on the number of the high quality beams.

The first offset can be defined as relative threshold compared to the highest quality beam of the serving cell and neighbor cells and used to determine which cells are considered for ranking based on high quality beams. Offset is expressed as decibels. This value may be signaled by network explicitly e.g. –2, –1, 0, 1, 2, 3, 4 dBs or given as an factor (integer –1, 0, 1, 2, 3 . . . to be multiplied with a specific number such as 0.5 dB.

The second offset can be defined as a relative threshold compared to the highest quality beam of serving and neighbor cells and used for determining high quality beams that contribute to an individual cell's overall rank. Alternatively, the second offset might not defined and the first offset would be used in place of the second offset. As another alternative, the second offset is equal to the first offset.

The first time-to-trigger is defined as the minimum time duration that a beam reception level (higher layer filtered/non higher layer filtered) must be above the relative threshold defined by Offset_1 (or Offset 2 if defined) so that it contributes to the cell rank.

The second time-to-trigger is defined as the minimum time duration that a beam reception level (higher layer filtered/non higher layer filtered) must be above the relative threshold defined by Offset_1 (or Offset 2 if defined) so that it contributes different value (e.g. higher) to the cell rank than per the first time-to-trigger.

In one further example, a specific Hysteresis value (H1) may be defined so that the beam RX-LVL equation can be written as RX-LVL>Cell1 RX-LVL−Offset_1+H1. H1 may be a positive or negative number (expressed in dBs, and can be also zero) and configured by network.

In a variant, a beams contribution to cell rank may scale also in following manner: TTT_1 is considered as default value and if the condition for beam RX-LVL>Cell1 RX-LVL−Offset_2 is fulfilled for duration of K*TTT_1 and K is integer then each TTT_1 duration adds+1 to cell rank so that K*+1 would be added to the cell rank. There may be a defined cap for the contribution value e.g. one beam can contribute up to value '5'.

In step 3, the Cells are ranked according to the points assigned in Step 2 in descending order, i.e. cell with the highest number of points is ranked highest. In case two cells are ranked with same value, according to points, the highest quality beam RX-LVL determines the rank between the equally ranked cells.

Thus, a cell is selected where that cell would have the highest final rank. That selecting could be for a conditional handover or for reselecting a cell for camping, where the UE possibly sends some indication to the base station for that cell where the UE receives a transmission from that base station in response.

The above parameters such as the contribution to cell rank (+1,+1.5,+2) etc. may be predefined in the specification (e.g. 3GPP) or signaled to UE via broadcast (system information) or dedicated signaling (RRC). Also, additionally or alternatively, the different set of parameters may be configured to UE based on which signal is used (e.g. SS block/CSI-RS). Parameters are common for all the cells is not explicitly configured with cell specific values.

In a variant, the cell ranking procedure may use in step 2 an alternative or additional interpretation of the configured offset (Offset_1, Offset_2) value so that higher the beam signal reception level (and closer the value to the highest quality beam reception level of all the cells) the higher the contribution value to cell rank. As an example, Offset_1 is configured with value of 3 dB. A beam with 3 dB lower reception level would contribute+1, a beam with 2 dB lower+2 and beam with 1 dB lower or the same would contribute+3. These are only one set of example values. This method can be used in conjunction with the TTT values.

In one example, the network may configure UE to perform the previously described ranking for cells that have been configured for UE for conditional HO. Based on the ranking UE would perform conditional HO to the highest ranked cell when triggers conditions are fulfilled i.e. a cell or multiple cell quality is offset better than current serving. Other conditions are not precluded.

In yet another example, UE may use the cell ranking when it is configured to report N-highest quality cell to network, or determine which cells UE prioritizes RRM (Radio Resource Management)/mobility measurements.

In yet another example, the cell ranking method can be applied for intra-cell mobility measurements/beam management where UE ranks different SS blocks of a serving cell (or multiple cells) for reporting based on the CSI-RS measurements (beams) of specific SS block. UE is given the association of specific CSI-RS and SS blocks via broadcast signaling (SIB, system information block) or via dedicated RRC signaling.

Although various aspects are set out above, other aspects comprise other combinations of features from the described embodiments, and not solely the combinations described above. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or technical effect of one or more of the exemplary embodiments disclosed herein is the added functionality.

It is also noted herein that while the above describes example embodiments of the invention, these descriptions should not be viewed in a limiting sense. Rather, there are several variations and modifications which may be made without departing from the scope of the present invention.

What is claimed is:

1. A method comprising:
    determining, by a user equipment in a wireless network, a highest quality cell from a plurality of cells, wherein the highest quality cell is determined based on measurement quantities of the plurality of cells;
    determining, by the user equipment, and in response to the determining of the highest quality cell, a subset of cells from the plurality of cells, wherein a quality of each cell of the subset is determined based on the measurement quantity of the respective cell being within a configured relative offset of the measurement quantity of the highest quality cell;
    determining, for each cell of the subset, a number of high quality beams based on a configured parameter; and
    selecting, from the subset, a cell having a highest number of high quality beams.

2. The method of claim 1, wherein the plurality of cells comprises a serving cell and one or more neighboring cells.

3. The method of claim 1, wherein the relative offset and the parameter are configured by a network node in the wireless network.

4. The method of claim 1, wherein the determining the number of high quality beams comprising measuring each beam with filtered beam measurements.

5. The method of claim 1, wherein the determining the number of high quality beams utilizes a first time period to determine whether a beam is a high quality beam, and wherein the first time period is defined as the minimum time duration that a beam reception level is above a threshold.

6. The method of claim 5, wherein the determining the number of high quality beams further utilizes a second time period, wherein the second time period is defined as the minimum time duration that a beam reception level is above a threshold so that it contributes different value to the cell rank than per the first time period.

7. The method of claim 1, further comprising: ranking the subset of cells based on the determined number of high quality beams.

8. The method of claim 1, where the selecting is for a conditional handover.

9. The method of claim 1, wherein the selecting a cell comprises reselecting a cell for camping.

10. An apparatus comprising:
at least one processor and at least one memory including computer program code, wherein the at least one memory and the computer program code are configured to, with the at least one processor, cause the apparatus to at least:
determine a highest quality cell from a plurality of cells wherein the highest quality cell is determined based on measurement quantities of the plurality of cells;
in response to the determining of the highest quality cell, determine a subset of cells from the plurality of cells, wherein a quality of each cell of the subset is determined based on the measurement quantity of the respective cell being within a configured relative offset of the measurement quantity of the highest quality cell;
determine, for each cell of the subset, a number of high quality beams based on a configured parameter; and
select, from the subset, a cell having a highest number of high quality beams.

11. The apparatus of claim 10, wherein the plurality of cells comprises a serving cell and one or more neighboring cells.

12. The apparatus of claim 10, wherein the relative offset and the parameter are configured by a network node in the wireless network.

13. The apparatus of claim 10, wherein the determining the number of high quality beams comprising measuring each beam with filtered beam measurements.

14. The apparatus of claim 10, wherein the determining the number of high quality beams utilizes a first time period to determine whether a beam is a high quality beam, and wherein the first time period is defined as the minimum time duration that a beam reception level is above a threshold.

15. The apparatus of claim 14, wherein the determining the number of high quality beams further utilizes a second time period, wherein the second time period is defined as the minimum time duration that a beam reception level is above a threshold so that it contributes different value to the cell rank than per the first time period.

16. The apparatus of claim 10, wherein the apparatus is further caused to: rank the subset of cells based on the determined number of high quality beams.

17. The apparatus of claim 10, where the selecting is for a conditional handover.

18. The apparatus of claim 10, wherein the selecting a cell comprises reselecting a cell for camping.

19. An apparatus comprising:
at least one processor and at least one memory including computer program code, wherein the at least one memory and the computer program code are configured to, with the at least one processor, cause the apparatus to at least:
send a configured relative offset to a user equipment, wherein the configured relative offset causing the user equipment to determine a highest quality cell from a plurality of cells, wherein the highest quality cell is determined based on measurement quantities of the plurality of cells, further causing the user equipment to determine a subset of cells from the plurality of cells, wherein a quality of each cell of the subset is within the configured relative offset of the highest quality cell determined based on measurement quantities of the plurality of cells; and
send a configured parameter to the user equipment, wherein the configured parameter causes the user equipment to select a cell from the subset having a highest number of high quality beams, and wherein a number of high quality beams is determined based on the configured parameter.

20. The apparatus of claim 19, wherein the selecting a cell comprises reselecting a cell for camping.

21. The method of claim 1, wherein the determining the highest quality cell from the plurality of cells comprises determining the highest quality cell as the cell with the highest quality beam, wherein the highest quality beam is determined based on at least one measurement comprising at least one of a Reference Signal Received Power(RSRP) measurement, a Reference Signal Received Quality (RSRQ) measurement, or a Signal to Interference and Noise Ratio (SINR) measurement.

22. The apparatus of claim 10, wherein the determining the highest quality cell from the plurality of cells comprises determining the highest quality cell as the cell with the highest quality beam, wherein the highest quality beam is determined based on at least one measurement comprising at least one of a Reference Signal Received Power(RSRP) measurement, a Reference Signal Received Quality (RSRQ) measurement, or a Signal to Interference and Noise Ratio (SINR) measurement.

23. The apparatus of claim 19, wherein the highest quality cell comprises the cell with the highest quality beam, wherein the highest quality beam is determined based on at least one measurement comprising at least one of a Reference Signal Received Power(RSRP) measurement, a Reference Signal Received Quality (RSRQ) measurement, or a Signal to Interference and Noise Ratio (SINR) measurement.

* * * * *

UNITED STATES PATENT AND TRADEMARK OFFICE
CERTIFICATE OF CORRECTION

Page 1 of 2

PATENT NO. : 11,856,467 B2
APPLICATION NO. : 16/610515
DATED : December 26, 2023
INVENTOR(S) : Timo Koskela et al.

It is certified that error appears in the above-identified patent and that said Letters Patent is hereby corrected as shown below:

On the Title Page

Delete the illustrative Figure and insert replacement FIG. 2 therefor, as shown on the attached replacement drawing sheet.

In the Drawings

In Sheet 2 of 2, replace FIG. 2 with replacement FIG. 2 therefor, as shown on the attached replacement drawing sheet.

Signed and Sealed this
Fifteenth Day of April, 2025

Coke Morgan Stewart
*Acting Director of the United States Patent and Trademark Office*